(12) United States Patent
Doyle

(10) Patent No.: US 8,763,601 B2
(45) Date of Patent: Jul. 1, 2014

(54) SOLAR TRACKER FOR SOLAR ENERGY DEVICES

(75) Inventor: Fintan J. Doyle, Silverthorne, CO (US)

(73) Assignee: Sulas Industries, Inc., Silverthorne, CO (US)

( * ) Notice: Subject to any disclaimer, the term of this patent is extended or adjusted under 35 U.S.C. 154(b) by 0 days.

(21) Appl. No.: 13/340,450

(22) Filed: Dec. 29, 2011

(65) Prior Publication Data

US 2012/0097149 A1      Apr. 26, 2012

(51) Int. Cl.
*F24J 2/38*      (2014.01)

(52) U.S. Cl.
USPC ............ 126/604; 126/618; 126/644; 126/645

(58) Field of Classification Search
USPC ......... 126/604, 600, 714, 271, 419, 582, 618, 126/644, 645; 108/7, 8
See application file for complete search history.

(56) References Cited

U.S. PATENT DOCUMENTS

| | | | | |
|---|---|---|---|---|
| 2,967,249 A | * | 1/1961 | Quirk | 250/215 |
| 3,171,403 A | * | 3/1965 | Drescher | 126/603 |
| 3,193,600 A | | 7/1965 | Ronzio et al. | |
| 3,302,391 A | | 2/1967 | Mihm | |
| 3,446,998 A | * | 5/1969 | Murphy | 310/306 |
| 3,635,015 A | * | 1/1972 | Samuels | 60/530 |
| 3,712,052 A | | 1/1973 | Staschke et al. | |
| 3,719,085 A | | 3/1973 | Sliger | |
| 3,777,495 A | | 12/1973 | Kuze | |
| 4,022,185 A | | 5/1977 | von Hartitzsch | |
| 4,027,651 A | | 6/1977 | Robbins, Jr. | |
| 4,063,543 A | | 12/1977 | Hedger | |
| 4,089,323 A | | 5/1978 | Trihey | |
| 4,108,154 A | * | 8/1978 | Nelson | 126/576 |
| 4,131,158 A | * | 12/1978 | Abhat et al. | 165/104.14 |
| 4,158,356 A | * | 6/1979 | Wininger | 126/579 |
| 4,159,710 A | | 7/1979 | Prast | |
| 4,175,391 A | | 11/1979 | Baer | |
| 4,191,172 A | * | 3/1980 | Walch et al. | 126/587 |
| 4,195,905 A | * | 4/1980 | Hansen | 126/604 |

(Continued)

FOREIGN PATENT DOCUMENTS

| | | |
|---|---|---|
| DE | 2842084 A1 | 5/1980 |
| DE | 9116151 U1 | 3/1992 |
| WO | 02084183 A1 | 10/2002 |
| WO | 03010471 A1 | 2/2003 |

OTHER PUBLICATIONS

International Search Report for PCT/US2012/071130 filed Dec. 21, 2012 for Sulas Industries, dated Jul. 17, 2013.

*Primary Examiner* — Avinash Savani
(74) *Attorney, Agent, or Firm* — Holland & Hart LLP

(57) ABSTRACT

A solar tracking device that uses thermal actuation to rotate a solar energy device to track movement of the sun for improved solar energy output of the solar energy device. Thermal actuation is generated by concentrating solar radiation using a solar collector and solar receiver. A medium that expands when heated is in thermal communication with the solar receiver and drives an actuator for rotating the solar tracking device to follow the movement of the sun. The medium may be a phase change material such as Paraffin wax. Rotational actuation may be performed using helical slots in a main housing and cam followers coupled to a shaft extended out of the main housing. At the end of the day, a combination of gravity and/or mechanical return forces may assist in returning the system to an initial position such that it is ready to receive solar radiation the next day.

20 Claims, 10 Drawing Sheets

(56) References Cited

U.S. PATENT DOCUMENTS

| | | | |
|---|---|---|---|
| 4,198,954 A | 4/1980 | Meijer | |
| 4,219,009 A | 8/1980 | Palmer | |
| 4,220,136 A * | 9/1980 | Penney | 126/600 |
| 4,226,502 A | 10/1980 | Gunzler | |
| 4,235,222 A | 11/1980 | Ionescu | |
| 4,253,304 A | 3/1981 | Lamb et al. | |
| 4,263,892 A | 4/1981 | Little et al. | |
| 4,275,712 A | 6/1981 | Baer | |
| 4,277,132 A * | 7/1981 | Hansen | 126/604 |
| 4,280,482 A * | 7/1981 | Nilsson, Sr. | 126/618 |
| 4,304,221 A | 12/1981 | Trihey | |
| 4,306,540 A * | 12/1981 | Hutchison | 126/607 |
| 4,306,541 A * | 12/1981 | Morrison et al. | 126/580 |
| 4,321,909 A * | 3/1982 | Trihey | 126/581 |
| RE30,961 E * | 6/1982 | Robbins | 126/580 |
| 4,332,240 A * | 6/1982 | Ward | 126/579 |
| 4,352,350 A * | 10/1982 | Johnson | 126/579 |
| 4,369,006 A | 1/1983 | Grams | |
| 4,387,702 A * | 6/1983 | Murphy et al. | 126/581 |
| 4,409,958 A * | 10/1983 | Fillios | 122/14.1 |
| 4,469,088 A * | 9/1984 | Anzai et al. | 126/618 |
| 4,469,938 A * | 9/1984 | Cohen | 250/203.4 |
| 4,476,854 A | 10/1984 | Baer | |
| 4,498,457 A * | 2/1985 | Kreamer | 126/591 |
| 4,505,263 A * | 3/1985 | Nameda et al. | 126/605 |
| 4,519,381 A * | 5/1985 | Tremblay | 126/579 |
| 4,628,142 A * | 12/1986 | Hashizume | 136/246 |
| 4,811,564 A * | 3/1989 | Palmer | 60/527 |
| 4,841,946 A * | 6/1989 | Marks | 126/618 |
| 5,033,865 A | 7/1991 | Kuze | |
| 5,222,277 A | 6/1993 | Harvey | |
| 5,269,851 A * | 12/1993 | Horne | 136/248 |
| 5,538,115 A * | 7/1996 | Koch | 188/266.6 |
| 5,622,078 A | 4/1997 | Mattson | |
| 5,727,585 A * | 3/1998 | Daume et al. | 136/246 |
| 6,058,930 A | 5/2000 | Shingleton | |
| 6,192,684 B1 | 2/2001 | McBirney | |
| 6,302,099 B1 * | 10/2001 | McDermott | 126/600 |
| 6,363,928 B1 * | 4/2002 | Anderson, Jr. | 126/577 |
| 6,988,364 B1 | 1/2006 | Lamb et al. | |
| 7,127,855 B1 * | 10/2006 | Garvey | 52/198 |
| 7,175,102 B2 | 2/2007 | Inoue | |
| 7,240,674 B2 | 7/2007 | Patterson | |
| 7,469,841 B1 | 12/2008 | Lamb et al. | |
| 7,763,835 B2 * | 7/2010 | Romeo | 250/203.4 |
| 7,884,308 B1 | 2/2011 | Mejia | |
| 8,251,054 B1 * | 8/2012 | Ashcraft | 126/600 |
| 2004/0035595 A1 * | 2/2004 | Fisher | 173/205 |
| 2007/0034207 A1 * | 2/2007 | Niedermeyer | 126/600 |
| 2008/0283121 A1 * | 11/2008 | Guerra | 136/259 |
| 2010/0095669 A1 | 4/2010 | Loveday et al. | |
| 2010/0192937 A1 * | 8/2010 | Vacca et al. | 126/263.01 |
| 2010/0200783 A1 * | 8/2010 | Lamb et al. | 251/11 |
| 2010/0275904 A1 * | 11/2010 | Bathurst et al. | 126/600 |
| 2011/0017273 A1 * | 1/2011 | Roach et al. | 136/246 |
| 2011/0214668 A1 * | 9/2011 | Al-Ansary et al. | 126/652 |
| 2012/0176867 A1 * | 7/2012 | Bradley | 367/173 |
| 2012/0285440 A1 * | 11/2012 | Kosaka et al. | 126/600 |
| 2013/0061845 A1 | 3/2013 | Tan | |

\* cited by examiner

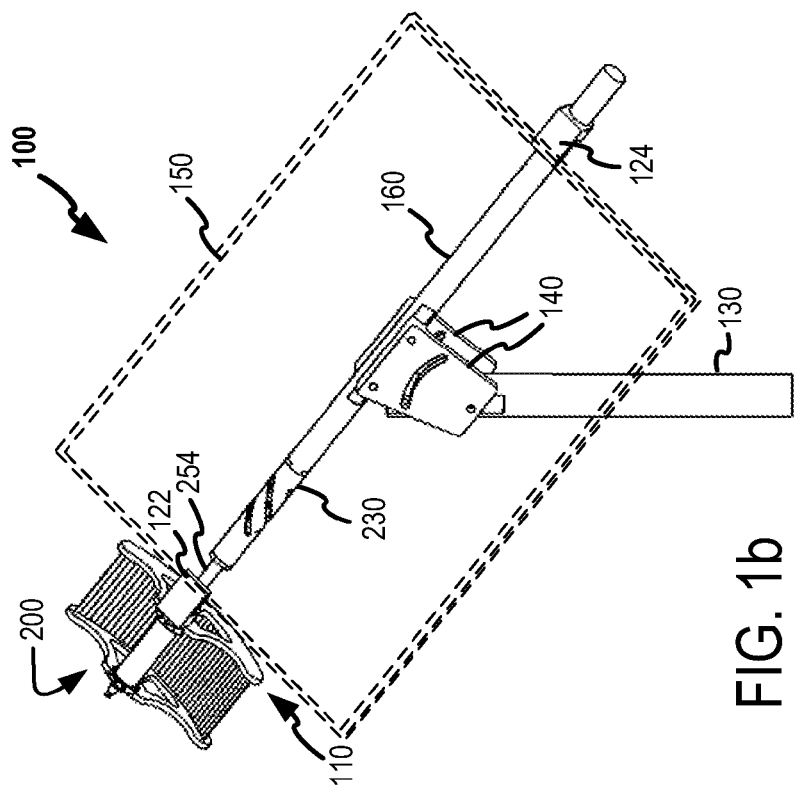
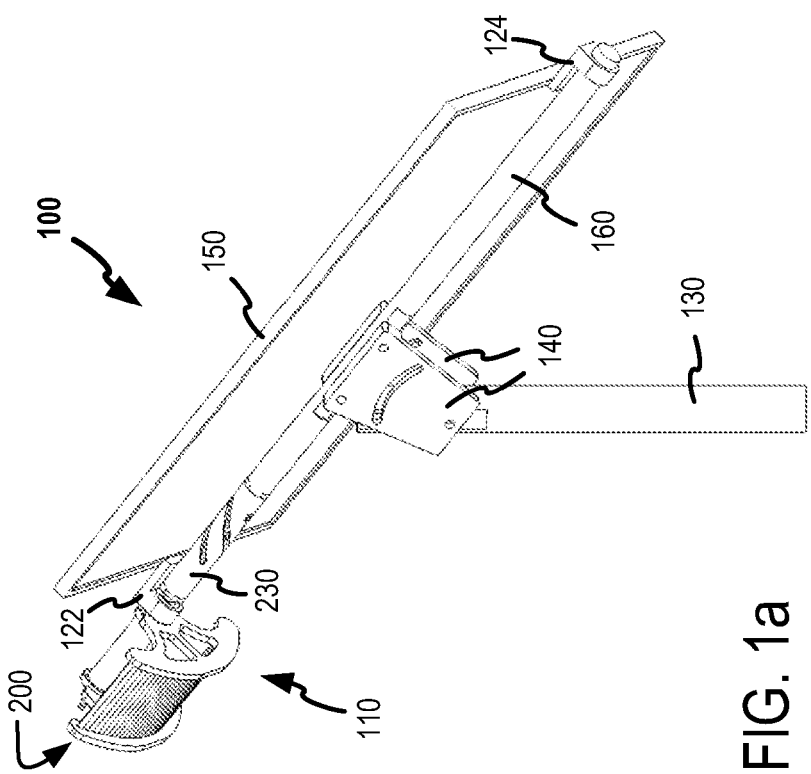

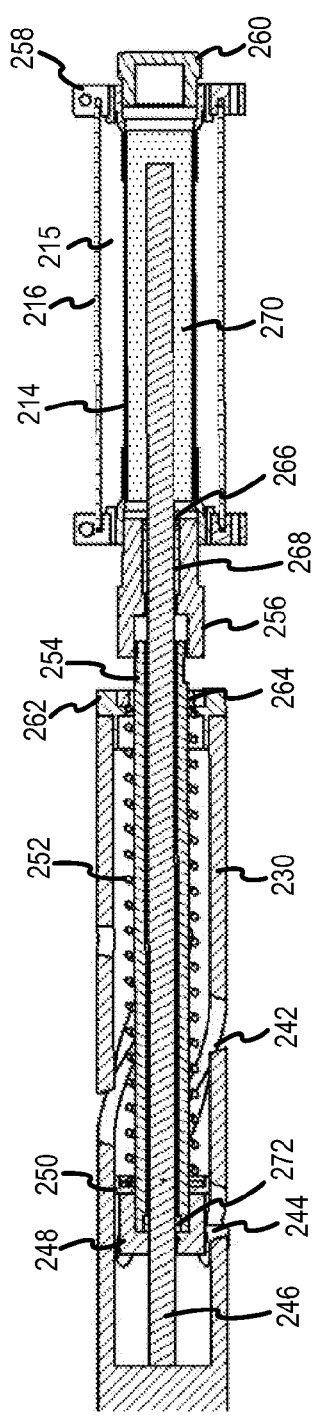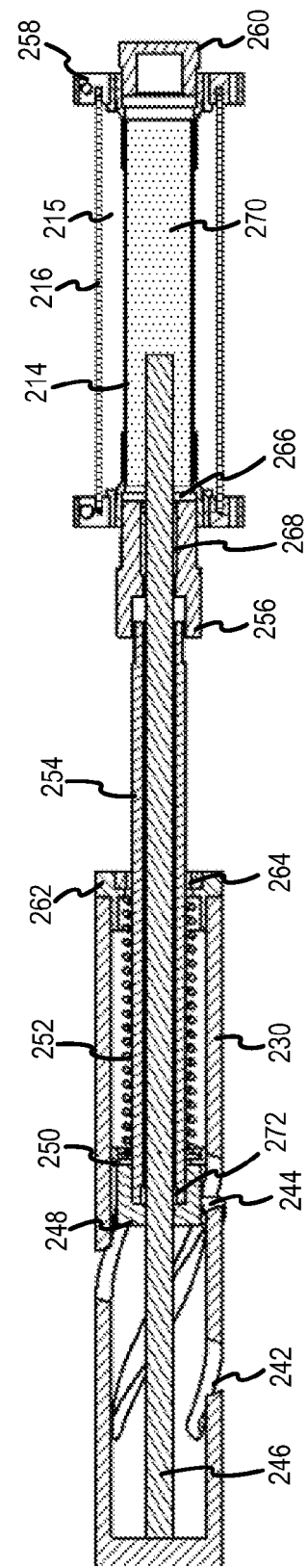

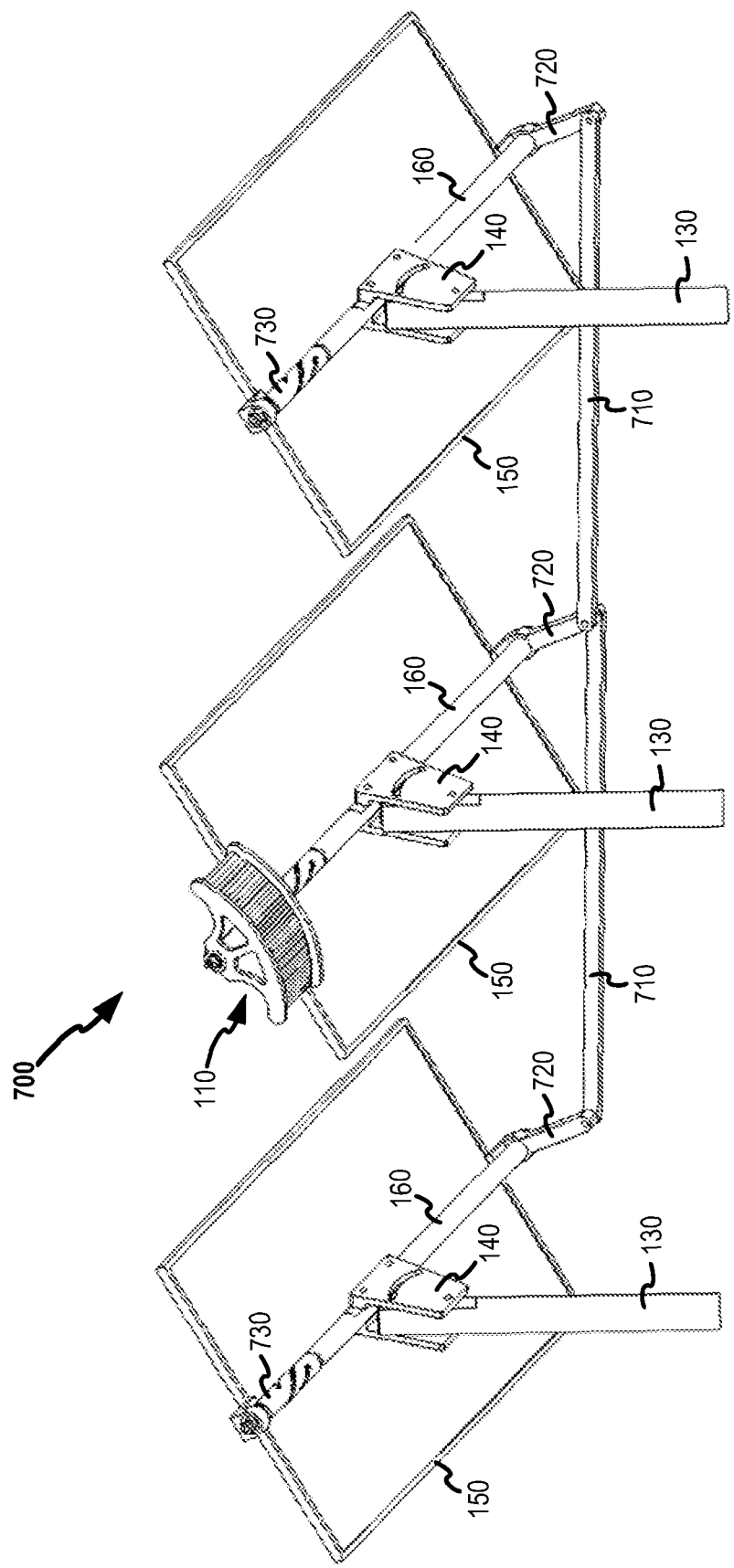

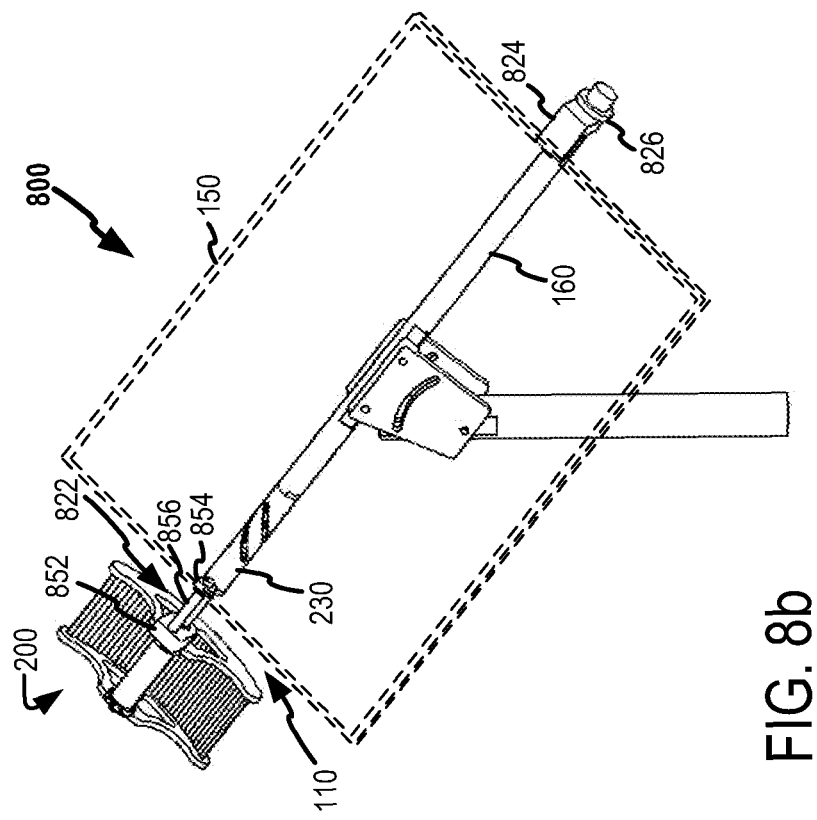
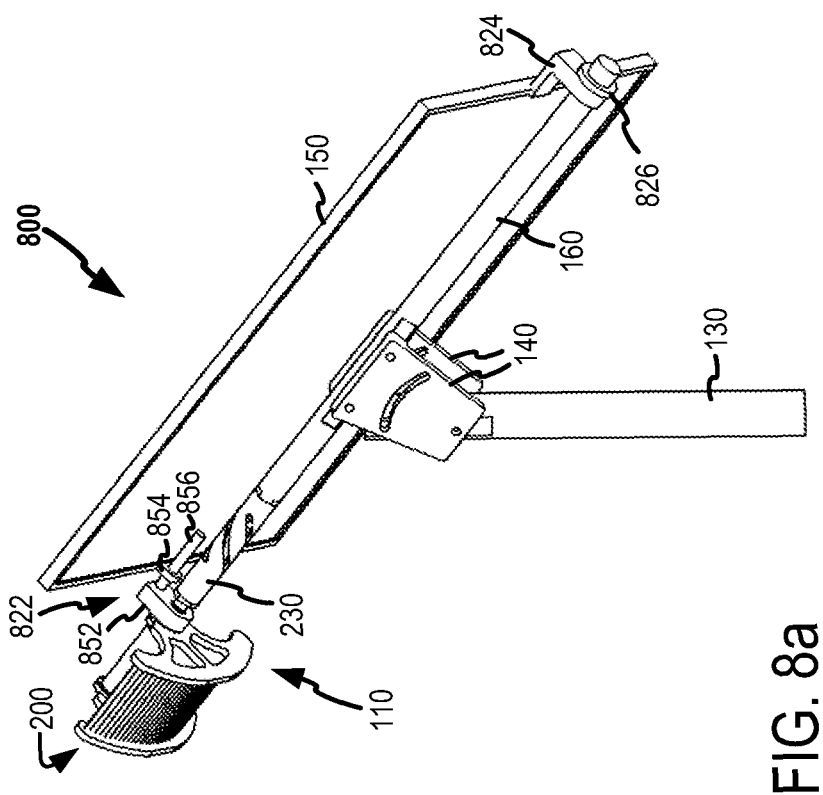

SOLAR TRACKER FOR SOLAR ENERGY DEVICES

BACKGROUND

1. Field

This Application relates generally to the field of solar energy, and more particularly to increasing energy output of solar energy systems.

2. Relevant Background

Renewable energy sources are increasingly seen as the solution to meeting growing energy demands while reducing greenhouse gas emissions and dependence on fossil fuels. Government energy policies, advances in renewable energy technology, and increased investment have contributed to rapid growth of many different renewable energy technologies.

Solar energy devices are one of the fastest growing segments of the renewable energy landscape. For example, grid-connected photovoltaic ("PV") solar devices increased at an average annual rate of 60 percent between 2004 and 2009. In 2009 alone, an estimated 7 GW of grid-tied PV capacity was added globally. Other solar energy technologies that are in use or development include concentrating solar power ("CSP"), solar hot water heating systems, solar food cookers, solar crop dryers, solar distilleries and desalinators, and the like.

Cost is a major driver for renewable energy installations. Specifically, renewable energy is typically more expensive per watt than fossil fuel energy including coal and natural gas. The primary costs associated with renewable energy sources such as solar energy are initial capital costs and maintenance costs. While the cost of some solar energy technologies such as photovoltaics are declining due to advances in technology and increases in manufacturing scale and sophistication, solar energy has generally not achieved cost parity with fossil fuel energy sources.

In solar energy systems, efficiency is an important aspect of useful energy output of the system. For example, commercial PV cells typically have less than 20% conversion efficiency of incident solar energy. Other factors affecting solar energy generation include the amount of incident solar energy at the installation site and incident angle of solar radiation on the solar energy system.

To increase efficiency, it is known to orient a solar energy device in the direction of maximum exposure to the sun's energy throughout the day. This orientation control, known as solar tracking, can increase the energy output throughout a day by approximately 20-40% over a fixed orientation solar energy device. Solar trackers generally track the sun's movement in either a single axis or using two axes. Single axis trackers have one axis of rotation, which may be oriented horizontally, vertically, or tilted at some angle to horizontal, with the tilt angle commonly adjusted based on latitude of the installation. Dual axis trackers are able to follow the sun in both horizontal and vertical directions and therefore provide optimum solar energy output for a solar energy system. However, tracking the sun's movement based on a single axis provides the most benefit over a fixed orientation with approximately 30% in increased output, with the additional axis of tracking providing only another approximately 6% in energy output.

Solar tracking is generally accomplished with either an active or passive control system. Active solar trackers use sensors or pre-determined data to find the current position of the sun, and actively orient the solar device to face the sun (e.g., using motors, gears, and computers). While active trackers can use a known solar position to orient and therefore are not prone to inaccuracy due to fluctuations in solar energy (e.g., passing clouds, etc.), they are generally expensive with regard to both initial installation and in maintenance costs.

Passive solar trackers orient a solar energy device without the use of motors. One commercial passive solar tracker uses the sun's energy to move a volatile liquid from a canister on one side of a solar panel to a canister on the other side of the solar panel, which then allows gravity to orient the panel. This technology is expensive, inaccurate, prone to upset by wind gusts, and requires large fluid canisters for orienting large solar energy systems. In addition, this type of system ends the day facing West, and does not re-orient overnight to face East. Accordingly, fluid canister solar trackers take time after the sun comes up in the morning to re-orient themselves to face East. Currently, both active and passive solar trackers can be a substantial cost component in a solar energy system. For these reasons, many solar installations are fixed orientation and do not use solar trackers.

SUMMARY

Embodiments of the present invention are generally directed to a solar tracker that uses thermal actuation to follow the sun's movement throughout the day. The solar tracker generally includes a collector that concentrates solar radiation on a receiver that is approximately at the focal point or focal area of the collector. The receiver absorbs the concentrated solar radiation and heats a thermally expanding medium. The hydraulic forces caused by the thermally expanding medium cause the collector to rotate about a rotational axis such that the collector leads the movement of the sun throughout the day. The rotation of the collector also rotates a solar energy device such that it generally faces the direction of incident solar radiation throughout the day. In various configurations, return of the solar tracker to the initial position is provided by gravity and/or mechanical spring forces such that it faces East at the start of the next day.

According to one aspect consistent with various embodiments, the solar tracking device includes a solar collector (e.g., a parabolic trough and the like) rotatably coupled to a rotational axis, a solar receiver that has a central axis and is disposed relative to the solar collector such that the central axis is substantially at a focal locus of the solar collector, and a medium in thermal communication with the solar receiver. Expansion of the medium actuates a rotation of the solar collector about the rotational axis such that an optic axis of the collector rotates in a direction of solar travel. The medium may be a phase change material or thermally expanding medium. For example, the medium may be a phase change medium that undergoes a phase transition from a solid phase to a liquid phase at a predetermined temperature such as Paraffin wax.

According to other aspects consistent with various embodiments, expansion of the medium may actuate an extension of a shaft coupled to the solar receiver axially out of a housing concentric with the shaft. In embodiments, the solar tracker may further include a piston disposed partially within the solar receiver, wherein expansion of the medium causes force on the piston relative to the solar receiver, a hollow shaft coupled to the solar receiver that is concentric with the piston and slidably engaged with the piston, a cam follower coupled to the shaft, and/or an annular housing concentric with the hollow shaft that has a cam travel profile, wherein the cam follower is slidably engaged with the cam travel profile, and wherein the cam travel profile and cam follower translate linear motion of the hollow shaft relative to the housing caused by force on the piston relative to the solar receiver into a simultaneous rotational motion of the hollow shaft relative to the annular housing. The solar tracking device may also include a transparent receiver envelope concentric with the solar receiver and separated from the external surface of the solar receiver by a gap.

According to other aspects consistent with various embodiments, the rotation direction of the optic axis of the solar collector caused by expansion of the medium is a direction of rotation of solar azimuth. The rotational axis may be positioned such that it is tilted at an axis tilt angle related to a solar elevation angle and/or such that a projection of the rotational axis on the earth's surface is substantially in a north-south orientation.

According to other aspects consistent with various embodiments, a solar energy system includes the solar tracker and a solar energy device rotatably coupled to the rotational axis. The solar collector may be coupled to the solar device at a fixed offset angle about the rotational axis. The fixed offset angle may be approximately equal to an acceptance angle of the solar collector.

According to other aspects consistent with various embodiments, a method of solar tracking includes concentrating incident solar radiation with a solar collector, the solar collector having a focal locus that receives solar radiation with an incident angle relative to an optic axis of the solar collector that is less than or equal to an acceptance angle of the solar collector, absorbing the concentrated solar radiation at a solar receiver that is disposed substantially at the focal locus of the solar collector, transferring energy from the concentrated solar radiation absorbed by the solar receiver to a medium, the medium expanding upon an increase in temperature of the medium, and actuating a rotation of the solar collector by the expanding of the medium, wherein the rotation actuation rotates the solar collector such that the optic axis of the solar collector rotates in a direction of solar travel. The method may include returning the solar collector to an initial position after an end of a tracking period at least partially by gravitational and/or mechanical spring forces.

According to other aspects consistent with various embodiments, a solar tracking device includes a solar collector, a solar receiver that has a longitudinal axis, a piston concentric with the longitudinal axis of the solar energy receiver and extending at least partially into a cavity defined by the solar receiver, a medium in the cavity of the solar receiver, wherein expansion of the medium actuates a linear motion of the piston relative to the solar receiver along the longitudinal axis, and a rotational device that translates the linear motion of the piston to rotational motion of the solar collector. An initial position of the solar collector at a beginning of a day may be greater than an azimuth angle of the sun at a beginning of the day.

BRIEF DESCRIPTION OF THE DRAWINGS

Embodiments of the present invention are illustrated in referenced figures of the drawings, in which like numbers refer to like elements throughout the description of the figures.

FIG. 1a illustrates a solar energy system employing a solar tracking device of the present invention, according to various embodiments.

FIG. 1b illustrates an alternative configuration of a solar energy system employing a solar tracking device of the present invention, according to various embodiments.

FIG. 6a illustrates a cross-section of components of a solar tracking device in an initial position, according to various embodiments.

FIG. 6b illustrates a cross-section of components of a solar tracking device in an extended position, according to various embodiments.

FIG. 7b illustrates another view of a solar energy system with multiple solar energy devices that are oriented by a single solar tracking device, according to various embodiments.

FIG. 8a illustrates a solar energy system that employs an alternative mounting arrangement for a solar energy device, according to various embodiments.

FIG. 8b illustrates the solar energy system of FIG. 8a in an alternative configuration, according to various embodiments.

DETAILED DESCRIPTION

Figure 2:
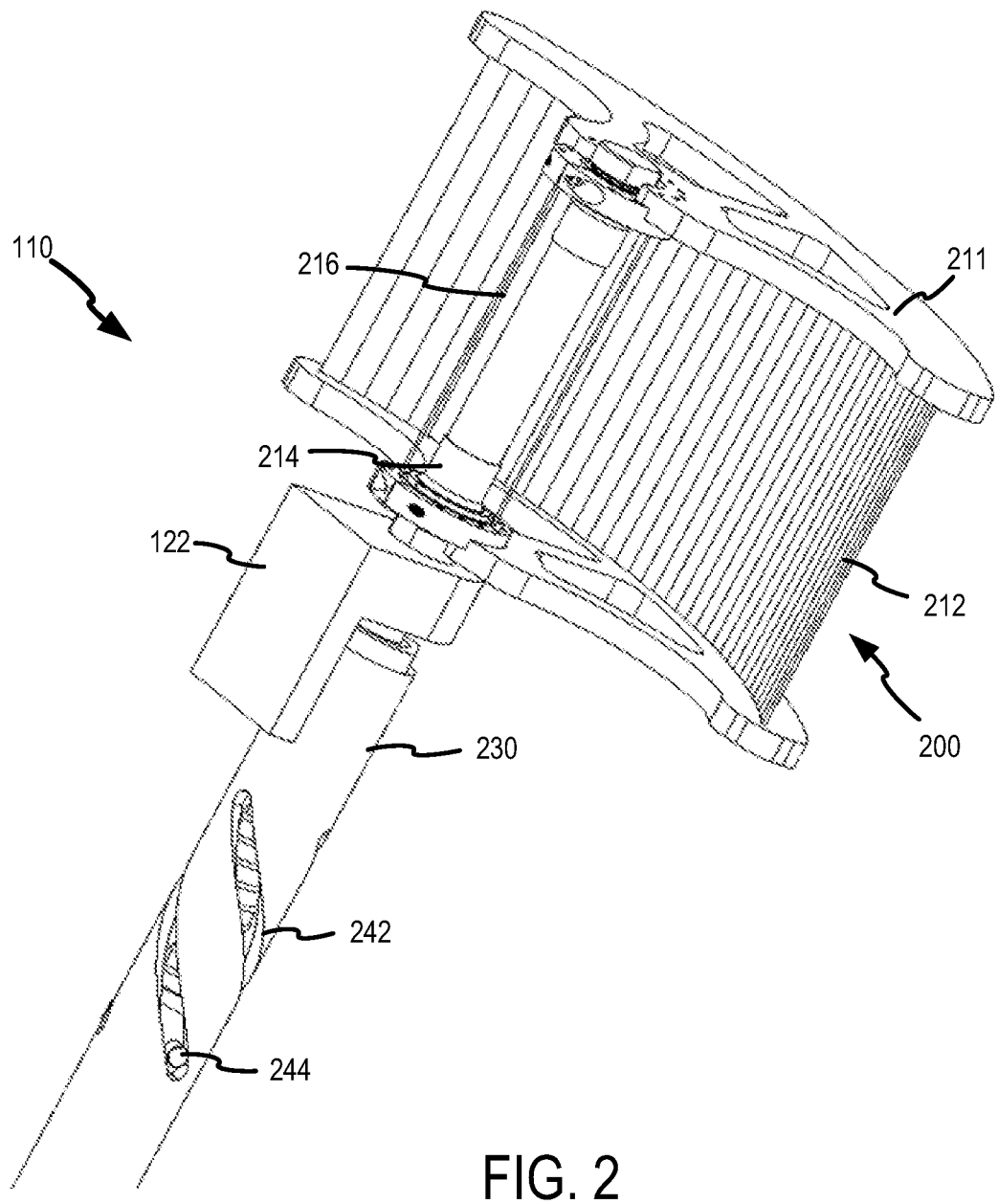
FIG. 2 illustrates aspects a solar tracking device for a solar energy system, according to various embodiments.

The present disclosure is generally directed to a solar tracking device for orienting a solar energy device (e.g., photovoltaic panel, etc.) towards the sun throughout a day. More particularly, the disclosed solar tracking device uses a solar collector (e.g., parabolic reflector and the like) that rotates the solar energy device to follow the sun based on thermal actuation. The solar tracking device focuses solar energy at a receiver, which then heats a thermally expanding medium causing mechanical actuation that rotates the collector such that the incident angle of the solar radiation is increased. That is, as the sun travels through the sky during the day, the collector rotates based on the thermal actuation in a direction that leads the direction of solar travel. At the end of the day, the thermal medium cools and the solar tracking device returns the solar energy device to an initial position (e.g., facing East) such that it is oriented correctly at the beginning of the next day. The solar tracking device may preferably be implemented as a tilted single-axis azimuth solar tracker, however, it may be implemented in other arrangements (e.g., horizontal axis, vertical axis, etc.).

FIGS. 1a and 1b illustrate a solar energy system 100 employing a solar tracking device 110 of the present invention, according to various embodiments. Generally, solar energy system 100 is mounted on a fixed support 130 and includes a solar energy device 150 mounted to the support 130 by way of mounting brackets 122 and 124, main pivot bar 160, and tilt-mount brackets 140. Tilt-mount brackets 140 are used to orient main pivot bar 160 at a desired angle, generally defining the rotational axis of solar energy system 100 as it tracks movement of the sun.

Solar energy device 150 may be any of a variety of devices for capturing solar energy and/or converting solar energy to electricity and/or heat including but not limited to photovoltaic ("PV"), concentrated solar power ("CSP"), solar hot water heaters, solar internal light systems (e.g., hybrid solar lighting, etc.), solar food cookers, solar distilleries, solar crop dryers, solar desalinators, and the like. While the present description generally illustrates solar energy device 150 as a solar PV panel, the disclosed solar tracking device may be used in any solar energy system that may benefit from solar tracking capability.

FIG. 1a illustrates the solar energy system 100 with solar tracking device 110 in an initial position (i.e., the morning configuration). Main pivot bar 160 provides the rotational axis for solar energy device 150 and may generally point in a North-South direction, and solar tracking device 110 may be at the North end of main pivot bar 160 for use in the Northern hemisphere. Main pivot bar 160 may be tilted at an angle relative to vertical using tilt brackets 140 that is related to an elevation of the solar path at the installation latitude. Solar tracking device 110, described in more detail below, is attached to main pivot bar 160 through a main housing 230. Solar energy device 150 is attached to solar tracking device 110 via upper bracket 122, and also attached to main pivot bar 160 by way of lower bracket 124, which is slidably and rotatably coupled to main pivot bar 160.

Solar tracking device 110 includes solar collector assembly 200, which rotates to lead the travel of the sun throughout the day. As solar collector assembly 200 tracks solar movement (e.g., azimuth tracking, etc.), solar tracking device 110 rotates solar energy device 150 about the rotational axis defined by the main pivot bar 160 through upper bracket 122. Solar collector assembly 200 rotates on a shaft that extends into main housing 230, which is attached to main pivot bar 160. Thermal expansion of a medium in the solar collector assembly 200 extends the shaft out of main housing 230, and cam followers on the shaft track in helical slots of main housing 230 to create the rotational movement of solar collector assembly 200 and solar energy device 150.

FIG. 1b illustrates components of the solar energy system 100 at a later time of day than in FIG. 1a, with the position of solar energy device 150 shown in dashed outline. For example, FIG. 1b may illustrate the solar energy system 100 in a late afternoon position. In this instance, shaft 254 is extended out of main housing 230 and solar collector assembly 200 and solar energy device 150 are rotated about the main pivot bar 160 to generally face a Westerly direction. As illustrated in FIG. 1b, lower bracket 124 slides and rotates on main pivot bar 160 to track the movement of upper bracket 122 rotated by the solar tracking device 110. While FIGS. 1a and 1b illustrate one technique for mounting solar tracker 110 to rotate a solar energy device 150, other mounting configurations are within the scope of the invention, and one of skill in the art may use a variety of mounting techniques to use solar tracking device 110 to rotate a solar energy device 150.

FIG. 2 illustrates solar tracking device 110 in more detail, according to various embodiments. Solar tracking device 110 includes solar collector assembly 200 that generally includes concentrating collector 212 supported by collector support 211, and receiver 214 which is positioned to receive solar radiation reflected by concentrating collector 212. Concentrating collector 212 may be, for example, a reflecting parabolic trough with an optic axis generally defined by the axis of symmetry of the parabola. Solar radiation incident on the reflecting parabolic trough that is generally parallel to the optic axis of the parabola is focused to a line defined by the focal point of the parabola. In embodiments, receiver 214 is mounted at or near the focal point of the parabola. As such, incident solar radiation that is substantially parallel to the optic axis of the parabolic trough is reflected by the concentrating collector 212 and absorbed by receiver 214. In this instance, receiver 214 absorbs the radiation incident on the collector 212 and converts the solar radiation to heat.

As receiver 214 absorbs solar radiation, it transfers heat to a medium that expands as it is heated over a given temperature range. In embodiments, the medium is a phase-change material ("PCM") that undergoes expansion at a phase transition temperature. For example, Paraffin wax is a PCM that expands by approximately 10-20% as it transitions from a solid or crystalline phase to a liquid phase. Paraffin wax also has a relatively high heat of fusion or enthalpy of fusion (e.g., 200-220 J/g), meaning that it absorbs a relatively large amount of heat during the latent heat phase when it transitions from a solid or crystalline phase to a liquid phase. This characteristic may provide additional advantages for solar tracking device 110 as described in more detail below.

The phase transition temperature of the PCM may also be adjusted based on desired operation. For example, the melting point of Paraffin wax may be adjustable over a wide range of temperatures as is known in the art. Preferably, the phase transition temperature of the PCM is greater than a highest expected ambient air temperature, such that the actuation caused by the phase transition does not occur without the heat generated by concentrated solar radiation on the receiver 214. ParaffinIn embodiments, the phase transition temperature of the PCM may depend on the expected maximum ambient air temperature at the installation location of the solar energy system. For example, in Phoenix, Ariz., where it is possible to have 120° F. ambient temperatures, a Paraffin wax with a melting point of 145° F. could be used. In a colder climate where 80° F. might be the expected maximum ambient air temperature during the year, a Paraffin wax with a melting point of 100° F. could be used.

In various embodiments, other thermally expanding mediums may be used. For example, some embodiments may use a medium with a relatively high positive coefficient of thermal expansion that does not undergo a phase change over the operational temperature range of the solar tracking device. For example, embodiments may use a thermally expanding polymer, hydraulic oil, mineral oil, vegetable oil, and/or other suitable thermally expanding medium.

Expansion of the medium (e.g., melting of the Paraffin wax and the like) causes an increase in hydraulic pressure of the medium that may be used to generate a mechanical actuation. For example, expansion of the medium may be used to cause actuation of a piston or other hydraulic actuator. Linear actuation (e.g., via a piston, etc.) is translated into rotational motion to rotate solar tracking device 110 to track the angle of the sun as it travels across the sky during the day. Solar energy device 150 is rotationally coupled to solar tracking device 110 such rotation of solar energy device 110 rotates solar energy device about main pivot bar 160 to track the direction of solar movement. Accordingly, solar tracking device 110 can significantly improve energy output of solar energy device 150 without needing electricity provided by the solar energy device or other sources.

Figure 3:
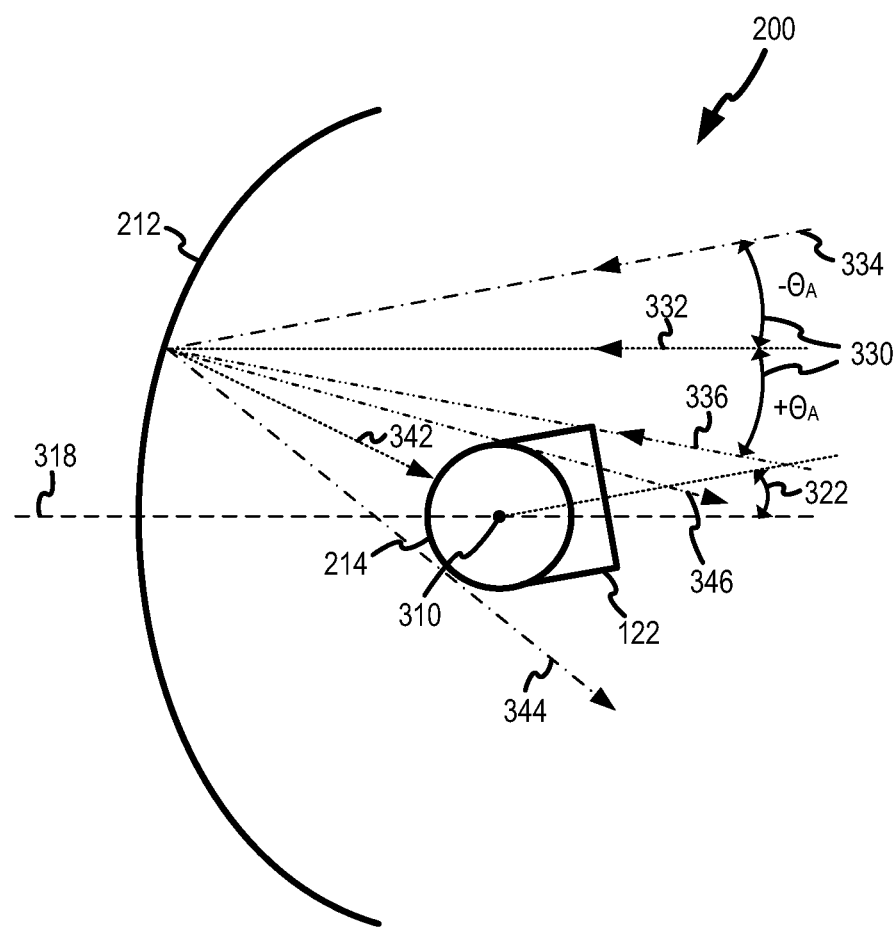
FIG. 3 illustrates aspects of a solar collector assembly for a solar tracking device, according to various embodiments

FIG. 3 illustrates aspects of solar collector assembly 200 in more detail, according to various embodiments. More particularly, FIG. 3 may illustrate a perspective view of components of solar collector assembly 200 along the axis of rotation of solar collector assembly 200. For example, solar collector assembly 200 may rotate about an axis 310 concentric with receiver 214. Solar collector 212 generally reflects incident solar radiation that is parallel to an optic axis 318 such that it is focused on receiver 214. For example, solar collector 212 may be a reflective parabolic trough with an axis of symmetry defined by optic axis 318. As such, an incident solar ray that is parallel to optic axis 318 (e.g., ray 332) is reflected from solar collector 212 to the focal point of the parabola (e.g., ray 342) and is absorbed by receiver 214. As the angle of incidence of solar radiation is increased, it is no longer focused on the focal point of the parabola. An acceptance angle $\Theta_A$ 330 may be defined as the angular extent for which solar radiation will be absorbed by receiver 214 in solar collector assembly 200. That is, solar rays that are incident on solar collector 212 at incident angles relative to optic axis 318 equal to an acceptance angle $\Theta_A$ 330 (e.g., rays 334 and 336), are reflected by solar collector 212 away from the focal point of the parabola (e.g., reflected rays 344 and 346) and are not absorbed by receiver 214. Therefore, a cone of acceptance may be defined as the angular extent of $\pm\Theta_A$ relative to the optic axis 318 for which solar radiation is concentrated substantially at receiver 214. The acceptance angle $\Theta_A$ 330 may be determined by characteristics of solar collector 212 and receiver 214 as described in more detail below.

Another parameter relevant to the operation of solar collector assembly 200 is concentration ratio C. Concentration ratio C may generally be defined as the ratio of solar radiation received by receiver 214 from collector 212 compared to nominal received solar energy (i.e., unconcentrated). Concentration ratio C may be determined by the ratio of the width of the collector divided by the surface area of the receiver. Concentration ratio C and acceptance angle $\Theta_A$ 330 may be adapted to achieve desired operating parameters of the solar tracking system as described in more detail below.

As illustrated in FIG. 3, bracket 122 may be angularly offset from optic axis 318 by an offset angle 322. That is, when solar energy device 150 is mounted to bracket 122, a primary axis of the solar energy device 150 (e.g., axis of incident solar radiation for highest efficiency) may be offset by bracket offset angle 322 about rotational axis 310. The bracket offset angle 322 may compensate for the angular offset between the incident solar radiation and the tracking mechanism of solar collector assembly 200, as described in more detail below. In embodiments, the offset angle 322 may be approximately equal to the acceptance angle $\Theta_A$. Optionally, the offset angle 322 may be chosen to be less than or more than the acceptance angle $\Theta_A$, or adjusted for a particular location (e.g., latitude, etc.) or time of year. In other embodiments, the offset angle 322 may be zero. That is, bracket 122 is optionally not angularly offset from optic axis 318 in these embodiments.

Figure 4A:
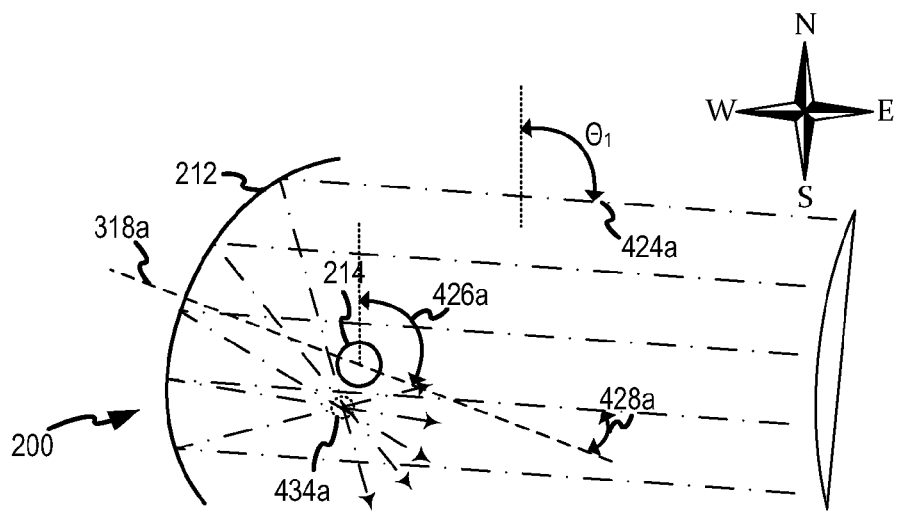
FIG. 4a illustrates aspects of operation of a solar collector assembly as it tracks the solar path throughout the day, according to various embodiments.
Figure 4B:
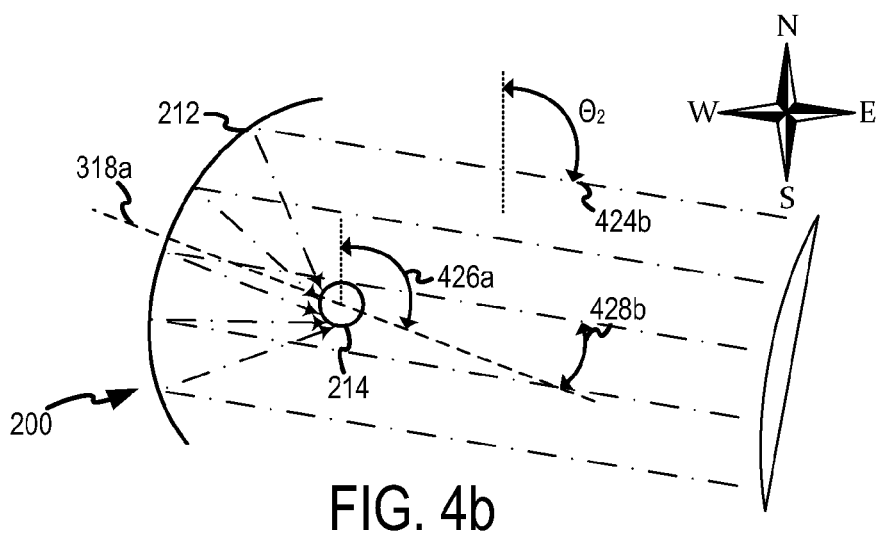
FIG. 4b illustrates other aspects of operation of a solar collector assembly as it tracks the solar path throughout the day, according to various embodiments.
Figure 4C:
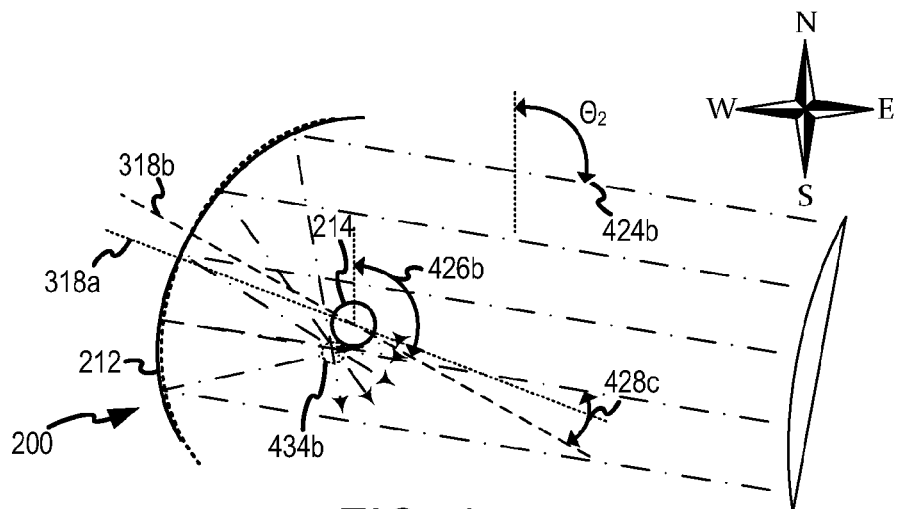
FIG. 4c illustrates yet other aspects of operation of a solar collector assembly as it tracks the solar path throughout the day, according to various embodiments.

FIGS. 4a-4c illustrate generally the operation of solar collector assembly 200 as it tracks the solar path throughout the day. FIGS. 4a-4c are illustrated with respect to a solar azimuth tracking configuration of solar collector assembly 200, and therefore describe the orientation of solar collection assembly 200 relative to solar azimuth. As such, tilt angle of solar collector assembly 200 is not illustrated in FIGS. 4a-4c. While FIGS. 4a-4c illustrate azimuth tracking using solar collector assembly 200, other tracking configurations (e.g., elevation, etc.) may operate in a similar manner as the general operation described in FIGS. 4a-4c. The term solar azimuth angle, as used herein, generally follows the convention of measuring solar azimuth angle as a clockwise angle from due North. In this regard, FIGS. 4a-4c describe the operation of solar collector assembly 200 in a Northern latitude as it tracks the sun describing a path with generally increasing solar azimuth angle throughout the day. For Southern latitudes, it should be understood that the sun rises in the East and describes an arc of generally decreasing azimuth angle as it travels across the sky throughout the day. As such, operation of the solar tracking device 110 in Southern latitudes may be understood by modifying the present description accordingly.

As illustrated in FIG. 4a, solar collector assembly 200 begins in a home position defined by a home angle 426a. Home angle 426a may generally be the angle of optic axis 318a of the collector 212 relative to solar azimuth angle in the home or initial position. As illustrated in FIG. 4a, solar azimuth angle is generally defined as the angle of incident solar radiation as measured from due North in a clockwise direction. In embodiments, home angle 426a is greater than 90 degrees in solar azimuth in Northern latitudes, meaning that solar collector assembly 200 does not fully rotate to face due East in the home or initial position. Generally, the home angle should be greater than the solar azimuth angle at sunrise such that the solar collector assembly 200 can initialize correctly. For example, the home angle could be set by the greatest (i.e., farthest South in the Northern hemisphere) solar azimuth angle at sunrise throughout the year for the latitude of installation of the solar energy system.

In embodiments, the home angle may be set to a solar azimuth angle several degrees greater than the greatest solar azimuth angle at sunrise during the year. For example, solar radiation in the early morning may be substantially reduced from mid-day because of greater atmospheric losses. Therefore, it may not be as important to rotate the solar energy device fully to face the azimuth angle of the sun at sunrise because the solar energy device 150 will have reduced overall energy output regardless of orientation until some time later in the morning. Additionally, the reduced solar radiation in the early morning may make it more difficult for the solar tracking device 110 to reach an operational temperature to begin tracking That is, at startup the thermal medium may be at approximately the ambient air temperature. If a PCM such as Paraffin wax is used as a medium, the startup condition may include heating the medium from the ambient air temperature to approximately the phase change temperature for the solar tracking device 110 to begin tracking. Because the startup heating cycle occurs during the time that the receiver is in focus (i.e., solar azimuth angle within $\pm\Theta_A$ of optic axis 318), greater solar radiation may encourage more reliable tracking initialization.

The startup condition in the morning may benefit from a home angle that positions the optic axis of the solar concentrator assembly 200 at a greater solar azimuth angle (in the Northern hemisphere) than the azimuth angle of the sun at sunrise. However, it may be possible that the home angle could be less than the solar azimuth angle at sunrise in certain conditions. For example, the home angle may be as much as the acceptance angle $\Theta_A$ of the solar collector assembly 200 less than the solar azimuth angle at sunrise. In embodiments, the home angle may be adjustable depending on latitude, or adjustable depending on time of year.

FIG. 4a may illustrate an instance where the sun is just above the Eastern horizon. In this instance, the sun has an azimuth angle of $\Theta_1$, and solar radiation 424a is incident on solar collection assembly 200 at an incident angle of 428a relative to optic axis 318a. In this regard, solar radiation 424a may have an azimuth angle of just greater than 90 degrees (i.e., slightly South of due East). This may correspond to a spring or fall day in a Northern latitude. For example, at 7 am on March 20 at an approximate latitude of 40 degrees (e.g., Silverthorne, Colo.), the azimuth angle of solar radiation is approximately 98.5 degrees. As illustrated in FIG. 4a, solar radiation 424a from the azimuth angle $\Theta_1$, incident on solar collection assembly 200 with a home angle of 426a is not focused on receiver 214, but is instead focused at a region 434a offset from the receiver 214.

FIG. 4b illustrates solar collector assembly 200 at a slightly later time during the day from FIG. 4a. In FIG. 4b, the solar azimuth angle is now given by $\Theta_2$, which may result in an incident angle 428b of solar radiation 424b relative to optic axis 318a that is equal to or less than the acceptance angle $\Theta_A$ of the solar collector assembly 200. As illustrated in FIG. 4b, the incident solar radiation 424b is now focused by collector 212 onto receiver 214. As receiver 214 absorbs solar radiation 424b, it transfers heat to a thermally expanding medium in thermal communication with receiver 214 and the medium causes a mechanical actuation that exerts a rotational force on solar collector assembly 200.

As illustrated by FIG. 4c, the rotational actuation causes solar collector assembly 200 to rotate in a clockwise direction relative to the solar azimuth coordinate system. That is, solar collector 212 rotates such that optic axis 318b now points in a direction that subtends a greater solar azimuth angle 426b. This rotation of solar collector assembly 200 causes solar radiation 424b to have an incidence angle of 428c, which may be approximately equal to the acceptance angle $\Theta_A$ of the solar collector assembly 200. As illustrated in FIG. 4c, because of the rotation of solar collector assembly 200, the incident solar radiation 424b may no longer be focused onto receiver 214 as it was in FIG. 4b. Therefore, receiver 214 is no longer absorbing concentrated solar radiation. As such, the receiver does not continue to transfer absorbed concentrated solar radiation to the medium, and the medium may stop expanding.

As described above, a PCM such as Paraffin wax may be used as a thermally expanding medium. In this instance, solar collector assembly 200 is stable in the position illustrated in FIG. 4c because of the latent heat storage of the medium. That is, because a PCM medium stores a relatively large amount of energy in latent heat, the medium does not begin to reduce in volume and reverse rotation of solar collector assembly 200 immediately when receiver 214 is no longer absorbing concentrated solar radiation. This condition is beneficial for tracking because it maintains the position of solar collector assembly 200 in the case of a temporary solar obstruction (e.g., passing cloud, etc.). When the temporary solar obstruction clears, the solar collector assembly 200 will again focus solar radiation on receiver 214, which transfers the absorbed radiation as heat to the medium and causes the solar collector assembly 200 to rotate further in the direction of solar travel to a new stable position (e.g., incident angle of solar radiation at approximately the acceptance angle $\Theta_A$ of the solar collector assembly 200).

FIG. 4c illustrates that solar collector assembly 200 may settle to an equilibrium relationship with the optic axis 318 at an angular position relative to a current solar azimuth of approximately the acceptance angle $\Theta_A$. That is, as the sun continues to rotate through its path (generally increasing solar azimuth angle in the Northern hemisphere), the solar collector assembly 200 continues to rotate when solar radiation is concentrated on receiver 214. More particularly, when receiver 214 absorbs concentrated solar radiation and transfers heat to the medium, the medium continues to provide mechanical actuation that moves the solar collector assembly 200 in front of the solar azimuth angle. As such, optic axis 318 of solar collector assembly 200 generally leads the solar azimuth angle throughout the day by approximately the acceptance angle $\Theta_A$ 330 of solar collector assembly 200.

Several parameters of solar collector assembly 200 may be adjusted to achieve desired operational characteristics of the solar tracking device 110. As described above, optical characteristics of solar collector assembly 200 include acceptance angle $\Theta_A$ and concentration ratio C. A high concentration ratio C (approximated by the aperture area of the collector 212 divided by the surface area of the receiver 214) provides a high thermal gain, which may provide faster tracking recovery and/or tracking startup. Acceptance angle $\Theta_A$ may also affect tracking startup and recovery of solar tracking device 110. Specifically, passing clouds or other solar obstructions may inhibit tracking for a period of time. A wider acceptance angle $\Theta_A$ 330 allows the sun to travel further while solar collector assembly 200 is obstructed (i.e., a longer obstruction time) and still allow solar tracking device 110 to recover. That is, once the solar azimuth angle leads the optic axis 318 by more than the acceptance angle $\Theta_A$, the solar tracking device 110 will not continue to track solar movement because further solar azimuth rotation will not bring the receiver 214 back in focus of the collector 212. For this reason, a wide acceptance angle $\Theta_A$ is generally desired. However, acceptance angle $\Theta_A$ and concentration ratio C are generally inversely related. That is, designing solar collector assembly 200 to have a large acceptance angle $\Theta_A$ generally reduces the concentration ratio C and vice-versa. In one embodiment, solar collector assembly 200 is designed with an acceptance angle $\Theta_A$ of approximately 2.75° and a concentration ratio C of approximately 15×. With these design characteristics, the solar tracking device 110 can recover from a temporary solar obstruction that lasts up to 22 minutes.

While the present description generally describes embodiments of solar collector assembly 200 where collector 212 is a parabolic trough and receiver 214 is a cylinder generally located at or near the focal line of the parabolic trough, other configurations of solar collector assembly 200 are contemplated. For example, collector 212 may be another type of reflective concentrating collector such as compound parabolic concentrator ("CPC"), cylindrical trough, hyperboloid, Fresnel reflector, and/or other type of concentrating collector (e.g., employing lenses, etc). Receiver 214 may also be a shape other than cylindrical (e.g., having a cross-section that is semi-circular, rectangular, etc.). In embodiments, receiver 214 may be positioned asymmetrically relative to collector 214. That is, receiver 214 may be offset from the focal point of the concentrating collector. For example, receiver 214 may be offset such that the acceptance arc (i.e., $\pm\Theta_A$) is offset from the geometric optic axis of the collector. In embodiments, this may result in the geometric optic axis of the collector tracking solar azimuth angle without being offset by the acceptance angle $\Theta_A$.

Referring back to FIGS. 1a, 1b, and 2, features and operation of embodiments of solar tracking device 110 are described in more detail. In the embodiment illustrated in FIG. 2, receiver 214 contains a thermally expanding medium (e.g., Paraffin wax), and expansion of the medium is used to generate a mechanical actuation through the use of a piston that extends from inside the receiver 214 into the main housing 230.

Figure 5:
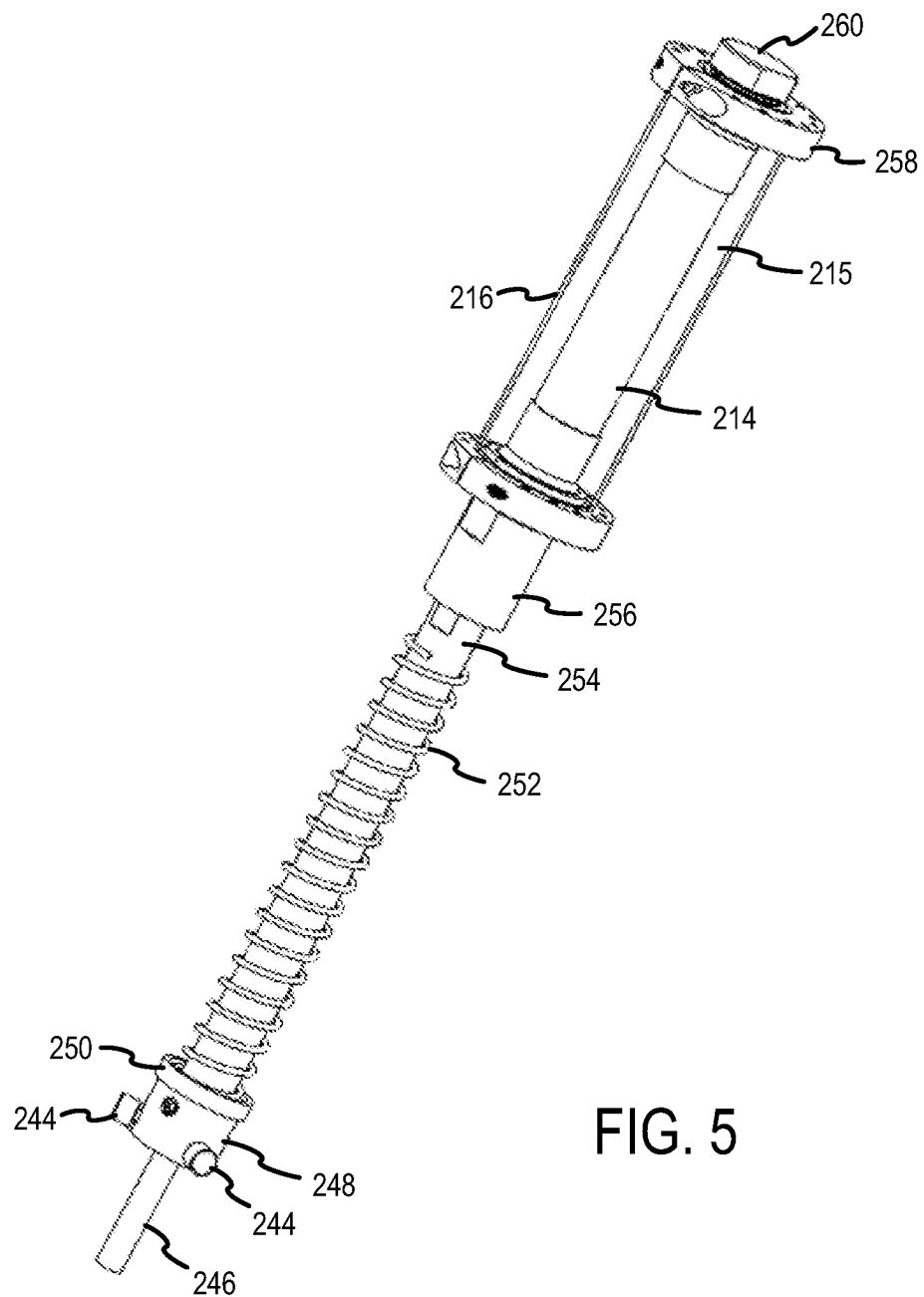
FIG. 5 illustrates a piston assembly for a solar tracking device, according to various embodiments

FIG. 5 illustrates a piston assembly for solar tracking device 110 in more detail, according to various embodiments. Referring to FIGS. 2 and 5, piston 246 extends from inside receiver 214 to a base of the main housing 230. As the medium expands (e.g., transition from solid to liquid of Paraffin wax, etc.), the expansion of the medium generates a hydraulic force on piston 246, which extends and forces hollow shaft 254 to extend out of main housing 230. As hollow shaft 254 extends out of main housing 230, cam followers 244 track in cam travel profiles 242 (e.g., helical slots, etc.) in main housing 230, causing guide collar 248 and hollow shaft 254 to rotate about piston 246. That is, cam travel profiles 242 and cam followers 244 translate the linear movement of piston 246 relative to hollow shaft 254 into a simultaneous linear and rotational movement of hollow shaft 254 relative to main housing 230. The rotation of hollow shaft 254 also rotates the solar collector assembly 200 (e.g., collector 212, collector support 211, receiver 214, receiver sleeve 216, collars 258, and/or cap 260, etc.).

FIGS. 6*a* and 6*b* illustrate cross-sections of components of solar tracking device 110 in various configurations. Turning initially to FIG. 6*a*, a cross-section of solar tracking device 110 in an initial or home position is illustrated, according to various embodiments. In this position, piston 246 is illustrated as coaxial with receiver 214 and extends substantially the length of the receiver 214. Receiver 214 also contains medium 270 (e.g., PCM material, Paraffin wax, etc.) in the cavity defined by receiver 214, to which it transfers energy as it absorbs solar radiation. Receiver 214 may be made from a material that absorbs solar radiation and conducts heat to medium 270 such as various types of metal (e.g., copper, aluminum, steel, etc.). Receiver 214 may also be coated with a variety of coatings (e.g., selective surface coating, etc.) to increase its absorption of solar radiation.

In embodiments, solar collector assembly 200 includes transparent receiver sleeve 216 that generally surrounds receiver 214. Transparent receiver sleeve 216 may be, for example, a glass tube with an antireflective coating concentrically arranged with receiver 214. Transparent receiver sleeve 216 reduces thermal losses of receiver 214 due to thermal convection and/or conduction. As such, receiver sleeve 216 may reduce the effects of ambient air temperature and other environmental factors (e.g., wind, etc.) on the operation of solar radiation concentrator assembly 200. In embodiments, gap 215 between receiver 214 and receiver sleeve 216 may be filled with air, an inert gas (e.g., Argon, etc.), or evacuated. Filling gap 215 with an inert gas or evacuating gap 215 may reduce thermal conduction and/or convection through gap 215 when compared with filling gap 215 with air.

Main seal housing 256 connects receiver 214 to hollow shaft 254. Hollow shaft 254 is slidably engaged with piston 246 via piston guide bushings 268 and 272. Main seal housing 256 includes seal 266 to seal medium 270 in receiver 214 while allowing piston 246 to slide through seal 266 and main seal housing 256. Shaft guide bushings 250 guide collar 248 coupled to hollow shaft 254 as cam followers 244, fixed to collar 248, travel through cam travel profiles 242 in main housing 230. Upper panel bracket 122 may be fixed to main seal housing 256 to rotate the solar energy device 150 as main seal housing 256 is extended and rotated through the range of motion of the solar collector assembly 200.

As described above, when solar radiation is incident within an angular cone of acceptance, heating of the medium 270 causes hydraulic pressure on piston 246, which extends hollow shaft 254. For example, a PCM medium such as Paraffin wax may begin to partially melt as the receiver 214 transfers the heat caused by absorbing concentrated solar radiation. The resulting rotation of solar collector assembly 200 causes the incident angle of solar radiation to increase, eventually causing solar radiation to no longer be focused substantially onto receiver 214. As this happens, receiver 214 is no longer absorbing as much radiation and transferring as much additional energy to medium 270. Therefore, the medium no longer continues to expand. For example, a PCM medium such as Paraffin wax may maintain a state in which the medium is partially liquid and partially solid. Therefore, the force exerted by medium 270 on piston 246 reduces, and solar tracking device 110 maintains the current position (or moves only very slowly). That is, once the receiver 214 is not receiving concentrated solar energy because the incident solar radiation is incident at an angle equal to or greater than the acceptance angle $\Theta_A$ of the collector 212, medium 270 is not being actively heated by concentrated solar radiation received by the receiver 214.

As the sun moves across the sky, its incremental movement causes a lowering of the incident angle of the solar radiation relative to the optic axis of the collector. That is, the sun's movement lowers the incident angle of solar radiation, while the rotation generated by cam followers 244 and helical slots 242 when medium 270 exerts force on piston 246 causes an increase in the incident angle of solar radiation. Therefore, as the system tracks solar movement, the shaft 254 continues to extend out from main housing 230 and the solar collector assembly 200 continues to rotate as the shaft 254 extends.

Turning to FIG. 6*b*, a cross-section of solar tracking device 110 in an extended position is illustrated, according to various embodiments. The extended position illustrated in FIG. 6*b* may correspond to the position of solar tracking device 110 late in the day, when the sun is in the Western part of the sky. FIG. 6*b* illustrates that in the extended position late in the day, medium 270 occupies substantially more volume of receiver 214 than it did in the initial position illustrated in FIG. 6*a*. For example, FIG. 6*b* may illustrate the condition of solar tracking device 110 where a PCM medium 270 such as Paraffin wax is in a substantially liquid phase.

The amount of incident solar radiation begins to reduce as the sun gets lower in the sky due to atmospheric losses. At some point during the day (e.g., late afternoon, evening, etc.), the incident solar radiation is substantially reduced and no longer provides enough heat to continue to expand the thermal medium. The sun then passes through incident angles where solar radiation is concentrated at the receiver 214, and eventually is incident past the optic axis 318 and at an angle greater than the acceptance angle $\Theta_A$ of the collector 212. In this instance, optic axis 318 no longer leads the angle of incident solar radiation, and the solar radiation is no longer focused on receiver 214.

Hence, towards the end of the day, solar tracking device 110 is in an extended position (e.g., the position illustrated by FIG. 6*b*) and receiver 214 is no longer receiving concentrated solar energy. As a result, medium 270 begins to cool down due to thermal transfer through various paths including radiative losses of receiver 214 and other thermal losses through the various thermally transmissive components (e.g., piston 246, etc.). As the medium 270 cools down, it contracts in volume. For example, if Paraffin wax is used as medium 270, it returns to the solid state as it cools. As the medium 270 cools, solar tracking device 110 may employ a variety of means to return to the initial position before the next morning. For example, spring 252 may exert a force on collar 248, returning it back to the position illustrated in FIG. 6*a* as the medium 270 cools. While spring 252 is illustrated as a coil spring, spring 252 may be another type of mechanical device including a gas spring and/or other mechanical spring device in a tension or compression arrangement. In other embodiments, the force to return solar collector assembly 200 to the initial position is provided by the weight of solar collector assembly 200 and/or solar energy device 150. That is, when positioned in a tilted configuration, solar tracking device 110 may partially support the weight of solar energy device 150. As the medium cools, the weight of solar energy device 150 and/or the solar collector assembly 200 provide enough force to return solar tracking device 110 to the initial position illustrated in FIG. 6a.

Referring back to FIGS. 1a, 1b, and 2, the operation of solar tracking device 110 as solar energy system 100 tracks solar movement is described in more detail. Generally, main pivot bar 160 may be oriented in a north-south direction, and tilted relative to horizontal at an angle related to the solar elevation angle of the sun's path across the sky at the latitude of installation of the solar energy system 100. As illustrated in FIGS. 1a, 1b, and 2, solar energy device is attached to solar collector assembly 200 via bracket 122. In the morning, the solar energy device 150 is generally rotated towards the East about the rotational axis defined by the main pivot bar 160. As the sun travels across the sky, solar tracking device 110 rotates the solar energy device 150 about the rotational axis such that it generally follows the azimuth angle of the sun throughout the day. In this regard, solar energy system 100 pictured in FIG. 1 is generally referred to as a tilted azimuth tracking solar energy system, in that a tilt angle of the solar energy device 150 is fixed by the main pivot bar 160 and the solar energy device 150 rotates about the main pivot bar 160 to track the azimuth of the sun as it travels across the sky during the day.

As illustrated in FIGS. 1a and 1b, the elevation angle of solar energy system 100 may be adjustable using tilt brackets 140. The tilt angle for the tilted azimuth tracking configuration of solar energy system 100 may be set in a variety of ways. For example, tilt angle may be determined by an average maximum solar elevation at a given latitude or selected to maximize energy generation. In embodiments, tilt angle may be adjusted at various times throughout the year using tilt brackets 140.

Figure 7A:
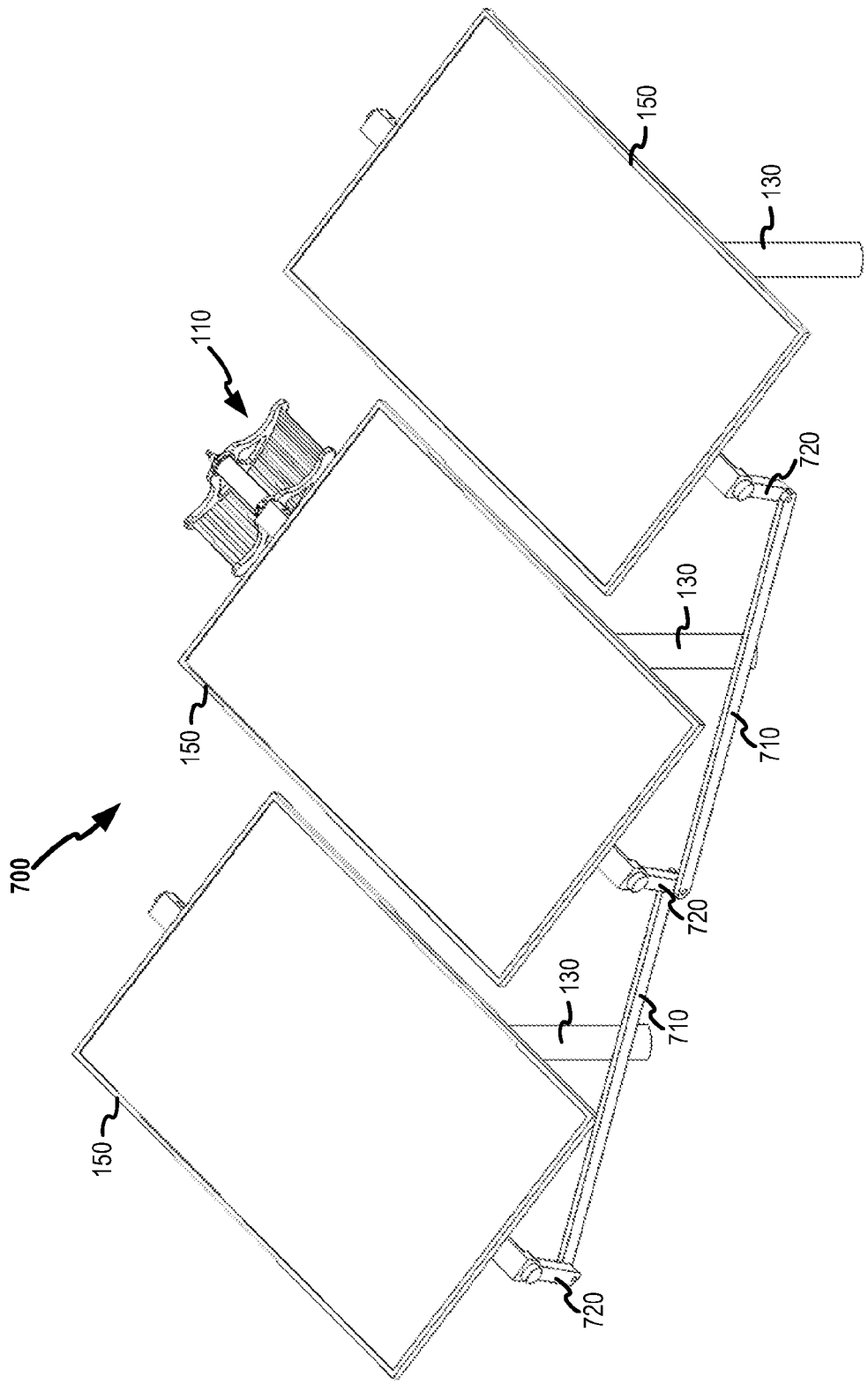
FIG. 7a illustrates a solar energy system with multiple solar energy devices that are oriented by a single solar tracking device, according to various embodiments.

In embodiments, solar tracking device 110 is used to orient multiple solar energy devices 150 in a ganged configuration. FIGS. 7a and 7b illustrate a solar energy system 700 with multiple solar energy devices 150 that are oriented by a single solar tracking device 110 according to embodiments of the present invention. Specifically, solar tracking device 110 is mounted to one of multiple solar energy devices 150 of solar energy system 700. As solar tracking device 110 moves one of the solar energy devices 150, the orientation movement is translated through a translation system to other ganged solar energy devices 150. For example, the orientation movement may be translated using lower gang brackets 720 connected to converter bars 710 between the ganged devices as shown in solar energy system 700. As illustrated in FIG. 7b, helical followers 730 may be used such that the other ganged solar energy devices 150 follow a similar movement path to solar tracking device 110 (e.g., helical movement, etc.). This may facilitate translation of movement of the solar tracking device 110 through gang brackets 720 and converter bars 710 with less frictional losses. In this way, each solar energy device 150 of solar energy system 700 rotates about each main pivot bar 160 to track the azimuth angle of the sun.

While FIGS. 7a and 7b illustrate a ganged configuration with three solar energy devices oriented with one solar tracking device 110, solar tracking device 110 may be able to drive a large number of ganged solar energy devices in a variety of configurations. Specifically, the large hydraulic forces created by the thermally expanding medium in solar tracking device 110 may be used to provide mechanical or hydraulic force to rotate solar energy devices connected through various mechanical or hydraulic actuators. Accordingly, the overall system cost may be reduced because of the reduced number of tracking devices required for a given solar energy installation.

While FIGS. 1a, 1b, 2, 5, 6a, and 6b illustrate one embodiment for solar tracking device 110, the basic operation of solar collector assembly 200, as illustrated in FIGS. 3, 4a, 4b, and 4c (i.e., solar azimuth tracking, solar elevation tracking, etc.), may be performed through other methods and devices. For example, gears, cables, and/or other hydraulic mechanisms may be used to translate the linear motion of the piston into rotational movement of solar collection assembly 200 and solar energy device 150.

FIGS. 8a and 8b illustrate a solar energy system 800 that employs an alternative mounting arrangement for solar energy device 150, according to various embodiments. In solar energy system 800, solar energy device 150 is mounted to solar tracking device 110 via sliding bracket assembly 822. Sliding bracket assembly 822 includes bracket 852 and rod 856 that are mounted to solar collector assembly 200, and collar 854 mounted to solar energy device 150 and slidably engaged with rod 856. FIG. 8a illustrates solar energy system 800 in an initial or home position. As solar tracking device 110 tracks solar movement, solar collector assembly 200 extends out of main housing 230 and rotates about an axis concentric with main housing 230 and main pivot bar 160 as described above. In this embodiment, solar energy device 150 is rotated by sliding bracket assembly 822, but because collar 854 is slidably engaged with rod 856, solar energy device 150 is not lifted by sliding bracket assembly 822. That is, solar energy device 150 does not move in an axial direction relative to main pivot bar 160 in this embodiment. In this case, lower bracket 824 rotates about pivot bar 160, but also does not move axially relative to pivot bar 160. Lock collar 826 holds lower bracket 824 in position on main pivot bar 160.

FIG. 8b illustrates components of solar energy system 800 in an extended position with the position of solar energy device 150 shown by a dashed outline. That is, FIG. 8b illustrates solar energy system 800 in a configuration where solar energy device 150 is rotated by solar tracking device 110 as it follows the solar movement throughout the day (e.g., facing West in the afternoon, etc.). As illustrated in FIG. 8b, solar collector assembly 200 is extended out of main housing 230 and rotated about an axis concentric with main housing 230 as described above. However, collar 854 slides on rod 856 as solar collector assembly 200 extends out of main housing 230, and therefore, solar energy device 150 rotates about main pivot bar 160 without moving in an axial direction relative to main pivot bar 160. At the end of the day, forces provided by spring 252 and/or gravity due to the weight of solar collector assembly 200 cause solar energy system 800 to return to the position illustrated in FIG. 8a.

The mounting arrangement of solar energy system 800 may be used in a tilted azimuth tracking configuration as illustrated in FIGS. 8a and 8b as well as other configurations (e.g., horizontal, vertical, etc.). Sliding bracket assembly 822 may also be used in a ganged panel configuration as illustrated in FIGS. 7a and 7b. Because solar energy device 150 is not lifted by sliding bracket assembly 822 in solar energy system 800, the helical followers 730 illustrated in FIG. 7b are not necessary to orient multiple solar energy devices in a ganged configuration driven by a single solar tracking device 110 using sliding bracket assembly 822.

Figure 9:
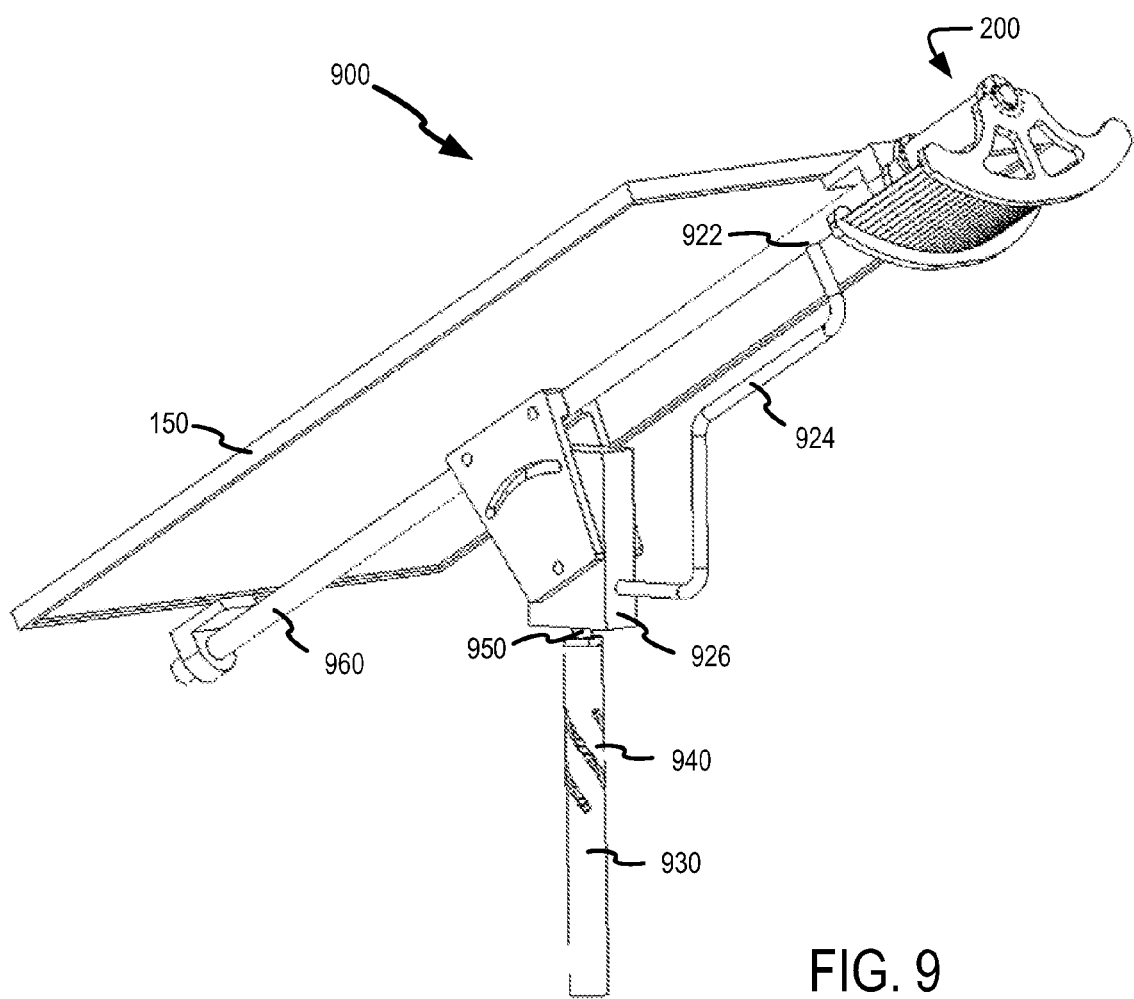
FIG. 9 illustrates a solar energy system that employs a solar tracking device according to embodiments of the present invention in combination with a conventional hydraulic system.

FIG. 9 illustrates a solar energy system 900 that employs a solar tracking device according to embodiments of the present invention in combination with a conventional hydraulic system. A solar tracking device for solar energy system 900 may include solar collector assembly 200 substantially as described above, with hydraulic force of medium 270 translated to a hydraulic fluid that is used to drive the tracking mechanism. Specifically, the mechanical energy of medium 270 may be transferred to a conventional hydraulic system by way of a hydraulic piston as is known in the art. Once the mechanical energy is transferred to a hydraulic fluid, it may be transferred through hydraulic port 922 to hydraulic line 924 and received at hydraulic distribution box 926. The mechanical energy of the hydraulic system may then be used to drive a lower tracking assembly 940.

As illustrated in FIG. 9, lower tracking assembly uses helical slots and cam followers to rotate solar energy device 150 mounted on tilt bar 960 to track the sun. Accordingly, lower tracking assembly 940 rotates and extends shaft 950 out of support housing 930 as the hydraulic pressure generated by medium 270 increases. At the end of the day, gravity and/or other means cause solar energy system 900 to return to the initial position such that solar collector assembly 200 and solar energy device 150 face generally East again the next morning. While FIG. 9 illustrates one way of using the hydraulic pressure generated by medium 270 to rotate solar energy system 900, it will be appreciated that the hydraulic pressure may be used to drive a variety of mechanisms to rotate, tilt, and/or extend solar energy device 150 and solar collector assembly 200 to track solar movement throughout the day.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The methods disclosed herein comprise one or more actions for achieving the described method. The various operations of methods described above may be performed by any suitable means capable of performing the corresponding functions. The method and/or actions may be interchanged with one another without departing from the scope of the claims. In other words, unless a specific order of actions is specified, the order and/or use of specific actions may be modified without departing from the scope of the claims.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A solar tracking device that may be employed in a solar energy system, the solar tracking device comprising:
   a solar collector rotatably coupled to a rotational axis, the solar collector having an optic axis;
   a solar receiver having a central axis, the solar receiver mounted to the solar collector such that the central axis is substantially coaxial with the rotational axis of the solar collector;
   a medium in thermal communication with the solar receiver, wherein the medium undergoes a phase change from a solid phase to a liquid phase at a predetermined temperature; and
   a piston disposed partially within the solar receiver and coaxial with the solar receiver, wherein hydraulic force from expansion of the medium causes force on the piston relative to the solar receiver to actuate a rotation of the solar collector about the rotational axis such that the optic axis of the collector rotates in a direction of solar travel.

2. The solar tracking device of claim 1, wherein the medium comprises Paraffin wax.

3. The solar tracking device of claim 1, wherein expansion of the medium actuates an extension of a shaft coupled to the solar receiver axially out of a housing concentric with the shaft.

4. The solar tracking device of claim 1, further comprising:
   a hollow shaft concentric with the piston and slidably engaged with the piston, the hollow shaft coupled to the solar receiver; and
   a cam follower coupled to the shaft; and an annular housing concentric with the hollow shaft, the housing having a cam travel profile, wherein the cam follower is slidably engaged with the cam travel profile, and wherein the cam travel profile and cam follower translate linear motion of the hollow shaft relative to the housing caused by force on the piston relative to the solar receiver into a simultaneous rotational motion of the hollow shaft relative to the annular housing.

5. The solar tracking device of claim 1, wherein the rotation direction of the optic axis of the solar collector caused by expansion of the medium comprises a direction of rotation of solar azimuth.

6. The solar tracking device of claim 1, wherein the rotational axis is tilted at an axis tilt angle related to a solar elevation angle.

7. The solar tracking device of claim 1, wherein a projection of the rotational axis on the earth's surface is substantially in a north-south orientation.

8. The solar tracking device of claim 1, further comprising a transparent receiver envelope concentric with the solar receiver and separated from the external surface of the solar receiver by a gap.

9. The solar energy device of claim 1, wherein the solar collector comprises a parabolic trough.

10. A solar energy system including the solar tracking device of claim 1, further comprising a solar energy device rotatably coupled to the rotational axis.

11. The solar energy system of claim 10, wherein the solar energy device is coupled to the solar collector at a fixed offset angle about the rotational axis.

12. The solar energy system of claim 11, wherein the fixed offset angle is approximately equal to an acceptance angle of the solar collector.

13. A solar tracking apparatus that may be employed within a solar energy system, comprising:
- solar collecting means rotatable coupled to a rotational axis;
- solar energy receiving means;
- means for mounting the solar energy receiving means to the solar collecting means such that a longitudinal axis of the solar energy receiving means is substantially coaxial with the rotational axis of the solar collecting means;
- piston means concentric with the longitudinal axis of the solar energy receiving means and extending at least partially into a cavity defined by the solar energy receiving means;
- expanding means in the cavity of the solar energy receiving means, wherein the expanding means undergoes a phase change from a solid phase to a liquid phase at a predetermined temperature, and wherein hydraulic force from expansion of the expanding means actuates a linear motion of the piston means relative to the solar energy receiving means along the longitudinal axis; and
- means for translating the linear motion of the piston means to rotational motion of the solar collecting means.

14. The solar tracking device of claim 1, wherein an initial position of the solar collector at a beginning of a day is greater than an azimuth angle of the sun at a beginning of the day.

15. A method of solar tracking, comprising:
- concentrating incident solar radiation with a solar collector rotatably coupled to a rotational axis, the solar collector having an optic axis;
- absorbing the concentrated solar radiation at a solar receiver having a central axis, the solar receiver mounted to the solar collector such that the central axis is substantially coaxial with the rotational axis of the solar collector;
- expanding a medium in thermal communication with the solar receiver, wherein the medium undergoes a phase change from a solid phase to a liquid phase at a predetermined temperature; and
- actuating, based on hydraulic force from expansion of the medium, a piston disposed partially within the solar receiver and coaxial with the solar receiver to cause a rotation of the solar collector about the rotational axis such that the optic axis of the collector rotates in a direction of solar travel.

16. The method of claim 15, further comprising:
- returning the solar collector to an initial position after an end of a tracking period at least partially by a gravitational force on the medium.

17. The method of claim 15, further comprising:
- returning the solar collector to an initial position after an end of a tracking period at least partially by a mechanical spring force.

18. The solar tracking device of claim 1, wherein the medium has an enthalpy of fusion greater than 200 Joules per gram.

19. The solar tracking device of claim 1, wherein the medium expands by approximately 10-20 percent as it transitions from the solid phase to the liquid phase.

20. The method of claim 15, wherein the medium has an enthalpy of fusion greater than 200 Joules per gram.

* * * * *